(12) United States Patent
Fu

(10) Patent No.: US 8,904,016 B2
(45) Date of Patent: Dec. 2, 2014

(54) METHOD AND APPARATUS FOR SELECTING NETWORK SERVICES

(75) Inventor: Yan Fu, Espoo (FI)

(73) Assignee: Nokia Corporation, Espoo (FI)

( * ) Notice: Subject to any disclaimer, the term of this patent is extended or adjusted under 35 U.S.C. 154(b) by 242 days.

(21) Appl. No.: 12/716,099

(22) Filed: Mar. 2, 2010

(65) Prior Publication Data

US 2011/0219127 A1 Sep. 8, 2011

(51) Int. Cl.
*G06F 15/16* (2006.01)

(52) U.S. Cl.
CPC .................................... *G06F 15/16* (2013.01)
USPC ........... 709/228; 709/223; 709/224; 709/225; 709/226; 709/227

(58) Field of Classification Search
CPC .................. H04L 29/08153; H04L 29/08162; H04L 29/08171
USPC .................. 709/223, 224, 225, 226, 227, 228
See application file for complete search history.

(56) References Cited

U.S. PATENT DOCUMENTS

| | | | | |
|---|---|---|---|---|
| 6,006,264 A * | 12/1999 | Colby et al. | ................. | 709/226 |
| 6,078,960 A | 6/2000 | Ballard | | |
| 6,643,704 B1 * | 11/2003 | Timms et al. | ................. | 709/239 |
| 6,687,731 B1 * | 2/2004 | Kavak | ........................... | 718/105 |
| 7,194,522 B1 * | 3/2007 | Swildens et al. | ............. | 709/217 |
| 7,930,427 B2 * | 4/2011 | Josefsberg et al. | ........... | 709/245 |
| 8,296,438 B2 * | 10/2012 | Brown et al. | ................. | 709/227 |
| 8,626,875 B2 * | 1/2014 | Viveganandhan et al. | ..... | 709/219 |
| 2005/0027862 A1 * | 2/2005 | Nguyen et al. | ............... | 709/225 |
| 2005/0138178 A1 * | 6/2005 | Astarabadi | .................... | 709/227 |
| 2006/0174018 A1 * | 8/2006 | Zhu et al. | ...................... | 709/229 |
| 2006/0268765 A1 * | 11/2006 | Bajic et al. | .................... | 370/328 |
| 2007/0110063 A1 * | 5/2007 | Tang et al. | .................... | 370/390 |
| 2009/0164646 A1 * | 6/2009 | Christian et al. | ............. | 709/228 |
| 2009/0222583 A1 * | 9/2009 | Josefsberg et al. | ........... | 709/245 |

OTHER PUBLICATIONS

Zhu, Lei, "Client Side Load Balancing for Web 2.0 Applications", Digital Web Magazine, Oct. 1, 2007, 10 pages.

* cited by examiner

*Primary Examiner* — Tammy Nguyen
*Assistant Examiner* — Jonathan Bui
(74) *Attorney, Agent, or Firm* — Ditthavong & Steiner, P.C.

(57) ABSTRACT

An approach is provided for selecting a network server. An apparatus comprising at least one processor, and at least one memory including computer program code, the at least one memory and the computer program code configured to, with the at least one processor, cause, at least in part, the apparatus to load from one or more network servers configuration information of one or more network servers used by a service provider network. The apparatus is also caused to select a network server in the service provider network based at least in part on at least one of network server latency and the network server load. The apparatus is further caused to set the network server as default network server used for at least one of current and future session on one or more user equipment.

15 Claims, 5 Drawing Sheets

METHOD AND APPARATUS FOR SELECTING NETWORK SERVICES

BACKGROUND

Various communication systems having a plurality of network servers may provide connectivity access to a service for one or more users. The connection may be performed, for instance, using a single device or any number of devices (e.g., mobile phones, personal digital assistants, computers, internet tablets, etc.). The network servers may be located in different terrestrial locations around the globe or be extraterrestrial.

SOME EXAMPLE EMBODIMENTS

According to one embodiment, a method comprises loading from one or more network servers configuration information of one or more network servers used by a service provider network. The method also comprises selecting a network server in the service provider network based at least in part on at least one of network server latency and network server load. The method further comprises setting of the network server as the default network server used for at least one of current and future session on one or more user equipment.

According to another embodiment, an apparatus comprising at least one processor, and at least one memory including computer program code, the at least one memory and the computer program code configured to, with the at least one processor, cause, at least in part, the apparatus to load from one or more network servers configuration information of one or more network servers used by a service provider network. The apparatus is also caused to select a network server in the service provider network based at least in part on at least one of network server latency and the network server load. The apparatus is further caused to set the network server as default network server used for at least one of current and future session on one or more user equipment.

According to another embodiment, a computer-readable storage medium carrying one or more sequences of one or more instructions which, when executed by one or more processors, cause, at least in part, the apparatus to load from one or more network servers configuration information of one or more network servers used by a service provider network. The apparatus is also caused to select a network server in the service provider network based at least in part on at least one of network server latency and the network server load. The apparatus is further caused to set the network server as default network server used for at least one of current and future session on one or more user equipment.

According to another embodiment, an apparatus comprises means for loading from one or more network servers configuration information of one or more network servers used by a service provider network. The apparatus also comprises means for selecting a network server in the service provider network based at least in part on at least one of network server latency and network server load. The apparatus further comprises means for setting of the network server as the default network server used for at least one of current and future session on one or more user equipment.

Still other aspects, features, and advantages of the invention are readily apparent from the following detailed description, simply by illustrating a number of particular embodiments and implementations. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for selecting a network server are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices may be shown in block diagram form in order to avoid unnecessarily obscuring the embodiments of the invention.

Figure 1:
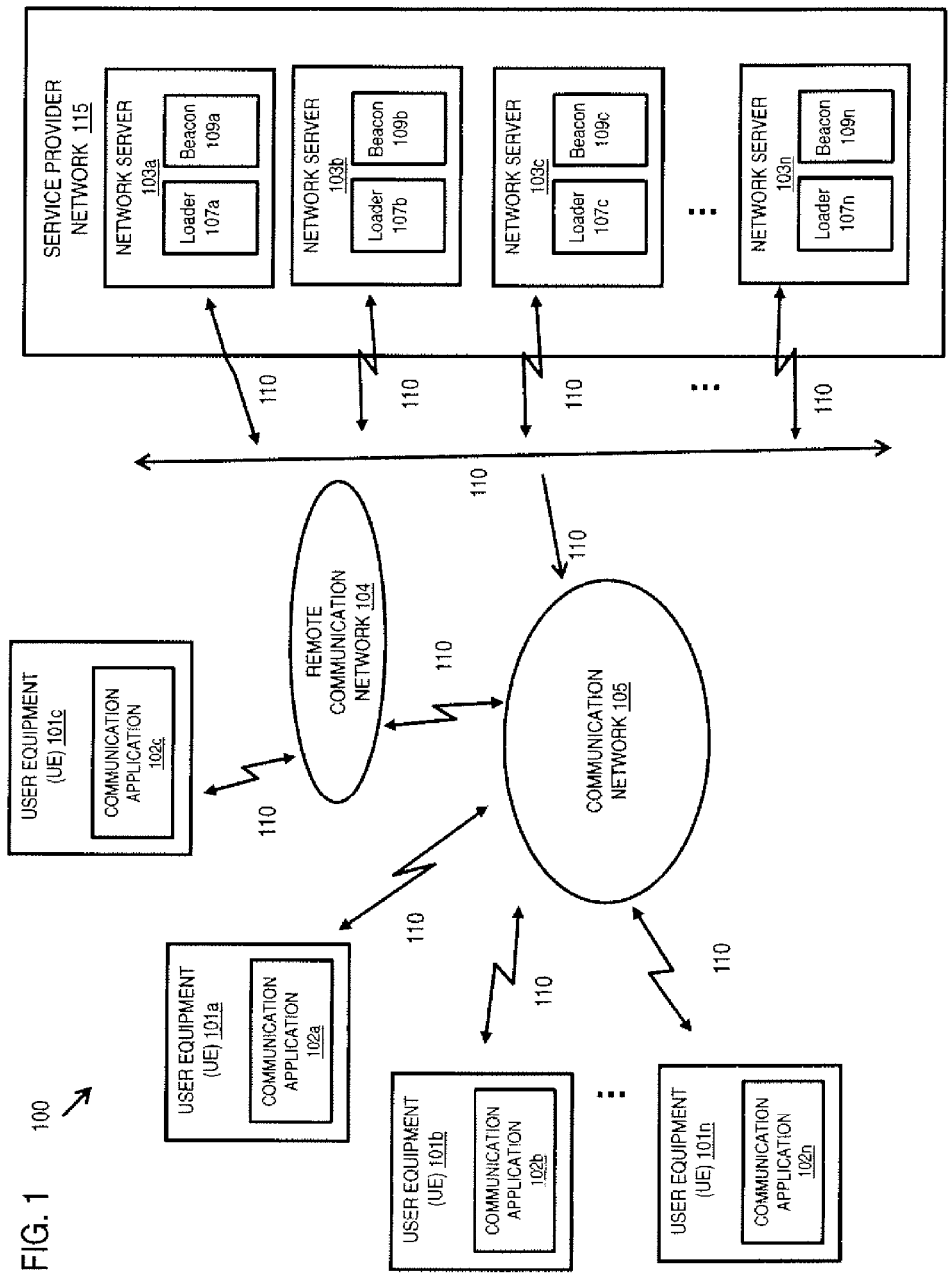
FIG. 1 is a block diagram of a communication system operating in accordance with an example embodiment of the invention.

FIG. 1 is a block diagram of a communication system 100 in accordance with an example embodiment of the invention. In an example embodiment, a communication system 100 comprises a plurality of network servers 103a-103n. Further, one or more network servers 103a-103n communicate with one or more other network servers 103a-103n and/or with one or more user equipment 101a-101n via one or more communication link 110, communication network 105 and/or remote communication network 104. Further, one or more network servers 103a-103n have one or more loaders 107a-107n and one or more beacons 109a-109n. One or more beacons 109a-109n are sent to one or more user equipment 101a-101n to indicate one or more parameters about one or more network servers 103a-103n. Further, one or more loaders 107a-107n and/or one or more beacons 109a-109n are sent to one or more network servers 103a-103n. Further, one or more loaders 107a-107n on one or more user equipment 101a-101n and/or one or more network servers 103a-103n request one or more beacons 109a-109n. Further, the one or more user equipment 101a-101n have a one or more communication applications 102a-102n for communicating with one or more user equipment 101a-101n, one or more network servers 103a-103n, communication network 105 and/or remote communication network 104. The one or more network servers 103a-103n and the one or more user equipment 101a-101n may connect to communication network 105 and/or remote communication network 104 via one or more communication links 110. The one or more communication links 110 may be wired, wireless and/or a combination thereof. In an example embodiment, communication system 100 may comprise of public, private and/or a combination thereof configuration and/or the like. Further, one or more network servers 103a-

103*n* may store data accessible to one or more other network servers 103*a*-103*n* and/or to one or more user equipment 101*a*-101*n* via communication network 105 and/or remote communication network 104. Configuration of communication system 100 may change as one or more user equipment 101*a*-101*n* and/or as one or more network servers 103*a*-103*n* connect or disconnect from the communication system 100.

In an exemplary embodiment, communication systems, such as communication system 100, may provide one or more user equipment with connectivity options for connecting to a service provider network 115. A service provider may have one or more terrestrial network servers 103*a*-103*n* located across the globe as well as extraterrestrial ones (not shown). FIG. 1 shows an example communication system 100 diagram for a single service provider network 115. One or more user equipment 101*a*-101*n* may be assigned to one or more network servers 103*a*-103*n* which provide service to one or more user equipment 101*a*-101*n*. However, in general, as communication systems expand and as the number of user equipment 101*a*-101*n* on a communication system grows, there may be occasions when a given network server 103*a*-103*n* may not be available or may not be able to provide any or a reliable service, which may be due various technical effects.

A communication system 100 of FIG. 1 introduces at least the following capabilities: (1) one or more user equipment 101*a*-101*n* connect to one or more network servers 103*a*-103*n*, (2) collect configuration information on one or more network servers 103*a*-103*n* of a service provider network 115 by requesting configuration information, or beacons 109*a*-109*n*, from one or more network servers 103*a*-103*n*, (3) identify one or more network servers 103*a*-103*n*, (4) select and connect to one or more network servers 103*a*-103*n*. By analyzing the configuration information on one or more network servers 103*a*-103*n*, such as network server 103*a*-103*n* load, or number of user equipment served by one or more network servers 103*a*-103*n*, and/or latency associated with a communication link 110 between one or more user equipment 101*a*-101*n* and one or more network servers 103*a*-103*n*, one or more user equipment 101*a*-101*n* select one or more network servers 103*a*-103*n* to connect to. There may be other status information, such as traffic conditions and/or communication link quality, on communication system 100, communication network 104, remote communication network 105, communication link 110 and/or one or more network servers 103*a*-103*n*. It is also possible that beacons 109*a*-109*n* may provide computer executable code for one or more user equipment 101*a*-101*n* to execute, which may assist in identifying and selecting one or more network servers 103*a*-103*n*. In an example embodiment, one or more default network servers 103*a*-103*n* are identified in computer code present on one or more user equipment 101*a*-101*n*. In another example embodiment, one or more user equipment 101*a*-101*n* select one or more network servers 103*a*-103*n* used in a last connection session as a default network server 103*a*-103*n* for its current or its next connection session. In yet another example embodiment, one or more user equipment 101*a*-101*n* communicate with one or more user equipment 101*a*-101*n* about availability of one or more network servers 103*a*-103*n*.

To access a service provided by a service provider network 115, one or more user equipment 101*a*-101*n* connect to one or more network server 103*a*-103*n*. If it is the first time that one or more user equipment 101*a*-101*n* is trying to connect to and access service at one or more network servers 103*a*-103*n*, one or more network servers 103*a*-103*n* will send loaders 107*a*-107*n* to one or more user equipment 101*a*-101*n*. Otherwise, communication applications 102*a*-102*n* will use its own loader 107*a*-107*n*. Loaders 107*a*-107*n* load content from one or more network servers 103*a*-103*n* within the service provider network 115. To do so, loaders 107*a*-107*n* may set a timeout period for this task. If the content is successfully loaded before the timeout event has started, loaders 107*a*-107*n* have completed their task, and one or more user equipment 101*a*-101*n* may continue accessing the service provided at one or more network servers 103*a*-103*n*.

Figure 2:
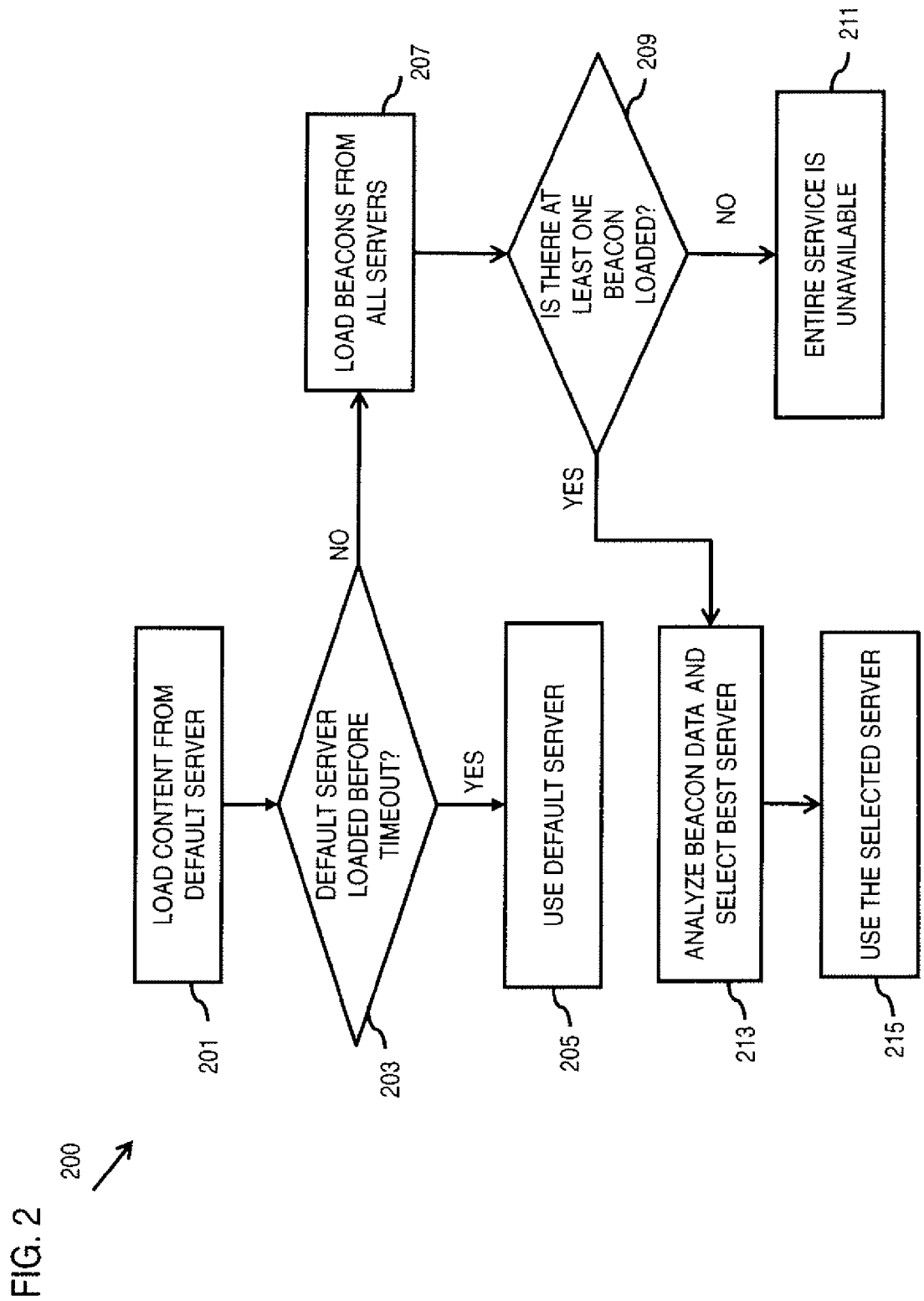
FIG. 2 is a flowchart of an example process for selecting a network server in accordance with an example embodiment of the invention.
Figure 3:
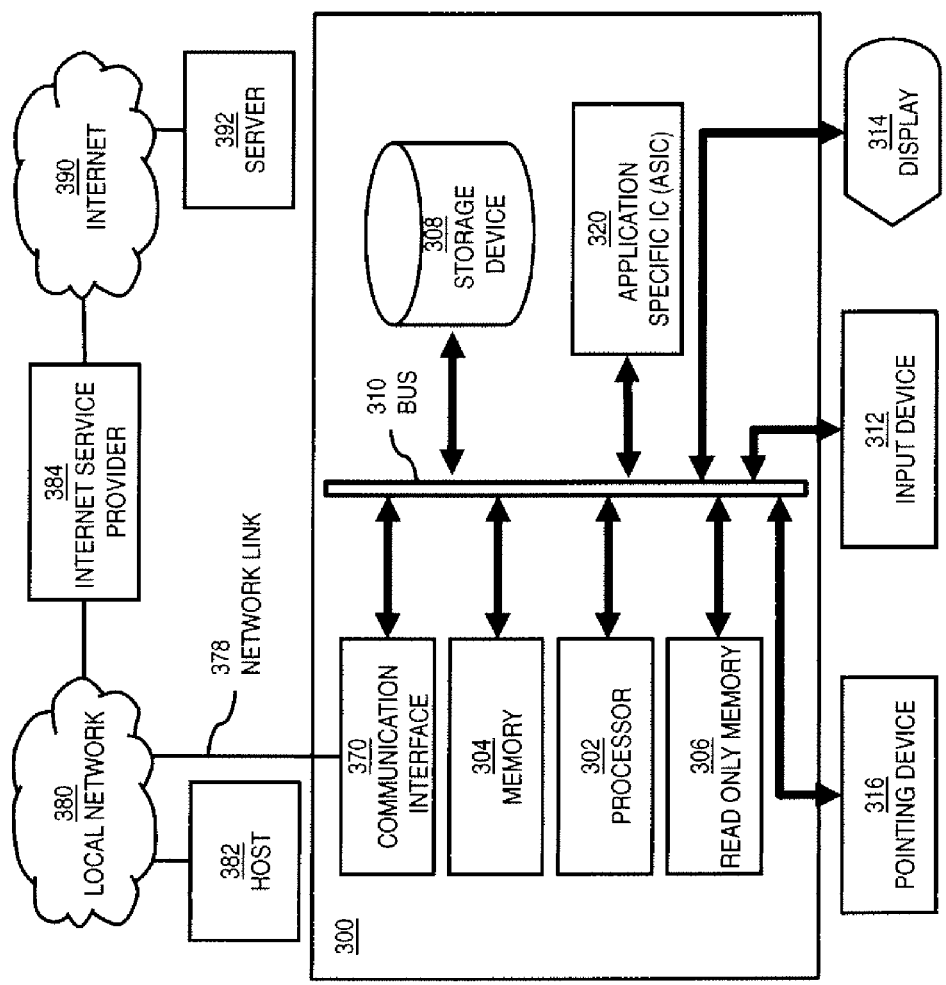
FIG. 3 is a diagram of an example apparatus operating in accordance with an example embodiment of the invention.

An apparatus, for example computer system 300 of FIG. 3 or a portion thereof, may perform example process 200 of FIG. 2. The apparatus may comprise means, including, for example at least one processor 302 of FIG. 3, for performing example process 200 of FIG. 2. In an example embodiment, an apparatus, for example computer system 300 of FIG. 3, is transformed by having at least one memory, for example memory 304 of FIG. 3, comprising computer code configured to, working with a processor, for example processor 302 of FIG. 3, cause the apparatus to perform example process 200 of FIG. 2.

In an example embodiment, at 201, the apparatus loads content from, for example a default network server of one or more network servers 103*a*-103*n* of FIG. 1. It is understood that any of network servers 103*a*-103*n* may be a default server for one or more apparatus.

At 203, the apparatus determines whether the loading at 201 was successful. For example, if loading at 201 was successful, the apparatus may proceed to step 205 where a default network server is selected from one or more network servers 103-103*n* such as in FIG. 1. However, for example, if loading at 203 was unsuccessful, the apparatus will set a predetermined limit on unsuccessful load attempts and/or a predetermined timeout period and upon reaching said limit and/or timeout period, the apparatus proceeds to 207.

At 207, the apparatus requests one or more beacons 109*a*-109*n* from one or more network servers 103*a*-103*n* available in service provider network 115 of FIG. 1. For example, it is possible that the apparatus may request one or more beacons 109*a*-109*n* from only one or more network servers 103*a*-103*n*.

At 209, the apparatus determines if it has successfully received one or more beacons 109*a*-109*n* from one or more network servers 103*a*-103*n* such as in FIG. 1. If at 209 there were no beacons 109*a*-109*n* successfully received, then the apparatus proceeds to 211 where a report of unsuccessful attempt is displayed on the apparatus. If at 209 one or more beacons 109*a*-109*n* were successfully received, then the apparatus may proceed to 213.

At 213, the apparatus analyzes the data received in one or more beacons 109*a*-109*n* in order to select and connect to one or more network servers 103*a*-103*n*. For example, one or more beacons 109*a*-109*n* may indicate configuration information such as number of user equipment on one or more network servers 103*a*-103*n*, or network server 103*a*-103*n* load, and/or latency associated with communication network 104, remote communication network 105 and/or communication link 110 between one or more apparatus and one or more network servers 103*a*-103*n*. For example, a network server 103*a*-103*n* load level 0 (zero) may indicate that the network server 103*a*-103*n* load is idle and a network server 103*a*-103*n* load level 9 may indicate that the network server 103*a*-103*n* is very busy. There may be other indicators for conveying other status information. A latency parameter may indicate the observed roundtrip time (RTT) on the request for loading the information, which could indicate communication latency between one or more apparatus and one or more network server 103*a*-103*n*.

At 215, for example, the apparatus may decide which network server 103a-103n may be a best choice based on the network server 103a-103n load and latency and proceed to load content from a chosen network server 103a-103n.

Figure 5:
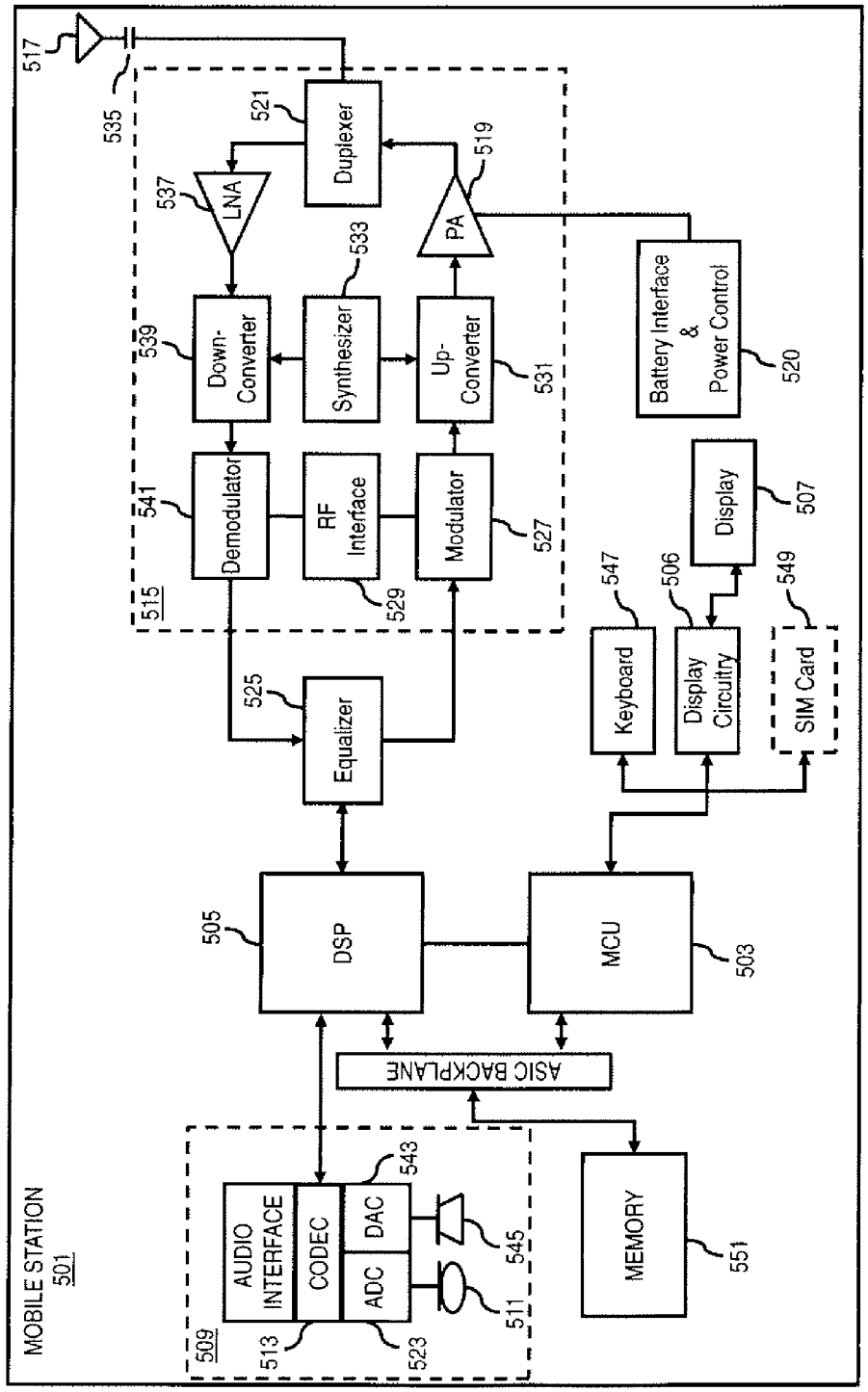
FIG. 5 is a diagram of a mobile terminal operating in accordance with an example embodiment of the invention.

FIG. 2 is a flowchart of an example process 200 for selecting one or more network servers 103a-103n in accordance with an example embodiment of the invention. In an example embodiment, one or more loaders 107a-107n such as in FIG. 1, perform example process 200 and is implemented in, for instance, a chip set including a processor and a memory as shown in FIG. 5.

At 201, content from a default network server 103a-103n is loaded. In an example embodiment, a loader 107a-107n such as in FIG. 1, loads content from a default network server 103a-103n. It is understood that any of network servers 103a-103n may be a default server for one or more user equipment 101a-101n.

At 203, the loader 107a-107n such as in FIG. 1, determine whether the loading at 201 was successful. For example, if loading at 201 was successful, example process 200 may proceed to step 205 where a default network server is selected from one or more network servers 103-103n such as in FIG. 1. However, for example, if loading at 203 was unsuccessful, the loader 107a-107n such as in FIG. 1 sets a predetermined limit on unsuccessful load attempts and/or a predetermined timeout period and upon reaching said limit and/or timeout period, example process 200 proceeds to 207.

At 207, the loader 107a-107n, such as in FIG. 1, request beacon 109a-109n from one or more network servers 103a-103n available in service provider network 115. For example, it is possible that a loader 107a-107n, such as in FIG. 1, may request beacons 109a-109n from only one or more network servers 103a-103n.

At 209, a loader 107a-107n, such as in FIG. 1 determines if it has successfully received one or more beacons 109a-109n from one or more network servers 103a-103n such as in FIG. 1. If at 209 there were no beacons 109a-109n successfully received, then example process 200 may proceed to 211 where a report of unsuccessful attempt is sent to one or more user equipment 101a-101n. If at 209 one or more beacons 109a-109n were successfully received, then example process 200 may proceed to 213.

At 213, one or more loader 107a-107n analyzes the data received in one or more beacon 109a-109n in order to select and connect to one or more network servers 103a-103n. For example, a beacon 109a-109n may indicate configuration information such as number of user equipment on one or more network servers 103a-103n, or network server 103a-103n load, and/or latency associated with communication network 104, remote communication network 105 and/or communication link 110 between one or more user equipment 101a-101n and one or more network servers 103a-103n. For example, a network server 103a-103n load level 0 (zero) may indicate that the network server 103a-103n load is idle and a network server 103a-103n load level 9 may indicate that the network server 103a-103n is very busy. There may be other indicators for conveying other status information. A latency parameter may indicate the observed roundtrip time (RTT) on the request for loading the information, which could indicate communication latency between one or more user equipment 101a-101n and one or more network server 103a-103n.

At 215, for example, the loader 107a-107n may decide which network server 103a-103n may be a best choice based on the network server 103a-103n load and latency and the loader 107a-107n may proceed to load content from a chosen network server 103a-103n.

As yet another example, one or more network servers 103a-103n may provide information about one or more other network servers 103a-103n within communication system 100 to one or more user equipment 101a-101n. As another example, one or more network servers 103a-103n may establish communication via one or more user equipment 101a-101n. In an example embodiment, one or more network servers 103a-103n may establish communication via one or more other network servers 103a-103n.

As an example, the following computer program code may be an implementation of example process 200.

```
y3fu@helix % cat globals.php
<?php
//simulated server delay
$g_delay = 2;
$g_delay_imag = 20;
//non cacheable pages are still valid for very short period
$g_page_session = 10;
//server name
$g_server_name = "jaunty_1 ";
//server load from 0 to 9
$g_server_load = 4;
function send_cache_header($expires, $body="1") {
    header 'Expires: ' . gmdate('D, d M Y H:i:s', time( )+$expires) .
    'GMT');
    header("Cache-Control: public, max-age=$expires");
    header('Last-Modified: '.gmdate('D, d M Y H:i:s') . 'GMT');
    header('Etag: '.md5($body));
}
function send_nocache_header( ) {
    header("Cache-Control: no-cache no-store");
    header("Expires: -1");
    header("Pragma: no-cache");
}
?>
y3fu@helix % cat test.php
<?php
$expires = 3600*24*365;
header('Expire: ' . gmdate('D, d M Y H:i:s', time( )+$expires) . 'GMT');
header ("Cache-Control: public, max-age=$expires");
header('Last-Modified: ' .gmdate('D, d M Y H:i:s') . 'GMT');
header('Etag: ' .md5("1"));
?>
<html>
<head>
<script language="JavaScript">
const default_time = 2000000000000;
const max_trials = 7;
const max_trials_load = 5;
const server_load_limit = 7;
foo.status = default_time;
setTimeout("check_status( )", 1000);
foo1.load = 10;
foo2.load = 10;
foo1.status = default_time;
foo2.status = default_time;
check_all_servers.which = 0;
check_all_servers.times = 0;
function foo( ) {
    currentTime = new Date( );
    current = currentTime.getTime ( );
    foo.status = current;
    window.top.location.replace("http://jaunty/index.php");
}
function check_status( ) {
    if (foo.status < default_time) {
        //take test-server to be default frame
        window.location = "http://jaunty/index.php";
    } else {
        // test other servers
        content = '<iframe width="0" height="0" id="jaunty_1"
src="http://jaunty_1/id.php" onload="foo1( )"></iframe>';
        content = content + '<iframe width="0" height="0" id="jaunty_2"
src="http://jaunty_2/id.php" onload="foo2( )"></iframe>';
        document.getElementById("output").innerHTML = content;
        setTimeout("check_all_ servers( )", 1000);
    }
```

```
}
function foo1( ) {
    currentTime = new Date( );
    current = currentTime.getTime( );
    foo1.load =
    document.getElementById("jaunty_1").contentWindow.length;
    foo1.status = current;
}
function foo2( ) {
    currentTime = new Date( );
    current = currentTime.getTime( );
    foo2.load =
    document.getElementById("jaunty_2").contentWindow.length;
    foo2.status = current;
}
function check_all_servers( ) {
    //alert(check_all_servers.times + ":" + foo1.status + ":" + foo2.status +
":" + foo1.load + ":" + foo2.load);
    check_all_servers.time++;
    if foo1.status == default_time && foo2.status == default_time {
        if (check_all_servers.times > max_ trials) {
            document.getElementById("output").innerHTML="Both
servers are down, check back later and good luck... ";
        } else {
            setTimeout("check_all_servers( )", 1000);
        }
    } else {
        //the following logic takes into consideration of both
roundtrips and server load. just as example.
        if foo1.status < foo2.status) {
            if (foo1.load < server_load_limit) {
                check_all_servers.which = 1;
                window.top.location.replace("http://jaunty_1/index.php");
            } else {
                if (foo2.status < default_time) {
                    check_all_servers.which = 2;
                    window.top.location.replace("http://jaunty_2/index.php");
                } else {
                    if (check_all_servers.times < max_trials_load) {
                        setTimeout("check_all_servers( )", 1000);
                    } else {
                        check_all_servers.which = 1;
                        window.top.location.replace("http://jaunty_1/index.php");
                    }
                }
            }
        } else {
            if (foo2.load < server_load_limit) {
                check_all_servers.which = 2;
                window.top.location.replace("http://jaunty_2/index.php");
            } else {
                if foo1.status < default_time) {
                    check_all_servers.which = 1;
                    window.top.location.replace("http://jaunty_1/index.php");
                } else {
                    if (check_all_servers.times < max_trials_load) {
                        setTimeout("check_all_servers( )", 1000);
                    } else {
                        check_all_servers.which = 2;
                        window.top.location.replace("http://jaunty_2/index.php" );
                    }
                }
            }
        }
    }
}
</script>
</head>
<body>
<div id="output" style="visibility:hidden;">
<iframe id="test-server" src="index.php"></iframe>
</div>
</body>
</html>
y3fu@helix % cat index.php
<?php
require "globals.php";
sleep($g_delay);
send_cache_header($g_page_session);
?>
<html>
<body>
<h1>It works!<h1>
<div id= "main" onload="foo( )">
this is from <?php echo "$g_server_name\n"; ?>
</div>
<script language="JavaScript">
//notify parent here
if parent.foo) {
    parent.foo( );
}
</script>
<p>
<img src='test-jpg.php'>
</body>
</html>
y3fu@helix % cat id.php
<?php
require "globals.php";
header("Cache-Control: no-cache, no-store");
header("Expires: -1");
header("Pragma: no-cache");
sleep($g_delay);
echo $g_server_name;
for ($i=0; $i<$g_server_load; $i++) {
    echo "<iframe></iframe>";
}
?>
y3fu@helix % cat test-jpg.php
<?php
require "globals.php";
header("Cache-Control: no-cache, no-store");
header-("Expires: -1");
header("Pragma: no-cache");
sleep($g_delay_image);
$ filename = "test.jpg";
$file = fopen($filename, "r");
$content = fread($file, filesize($filename));
fclose($file);
echo $content;
?>
y3fu@helix %
```

As shown in FIG. 1, the communication system 100 comprises one or more user equipment (UE) 101a-101n having connectivity to one or more of the network servers 103a-103n via a communication network 105 and/or a remote communication network 104. By way of example, the communication network 105 and remote communication network 104 of communication system 100 may include one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101a-101n is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), audio/video player, digital camera/camcorder, positioning device, television receiver, radio broadcast receiver, electronic book device, game device, or any combination thereof. It is also contemplated that the UE 101a-101n can support any type of interface to the user (such as "wearable" circuitry, etc.).

The UE 101 may include a communication application 102. The communication application 102 is capable of handling various communication operations using the forms of communicating available at the UE 101. For example, the communication application 102 may manage incoming or outgoing communications via the UE 101, and display such communication as they are received or processed. In certain embodiments, the communication application 102 may also provide visualization (e.g. graphical user interface) to allow a user to control communication over the communication networks 104 and/or 105 using any available form of communication.

The communication system 100 may provide various services related to communication for the UEs 101a-101n, such that the UEs 101a-101n may communicate with each other as well as communicate with network servers 103-a-103n. The communication system 100 may include a cellular phone service, internet service, data transfer service, etc. The network servers 103a-103n may also provide content such as music, videos, television services, etc.

Communication between communication networks 105, remote communication networks 104, network servers 103a-103n and one or more user equipment 101a-101n, are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

FIG. 3 illustrates a computer system 300 upon which an embodiment of the invention may be implemented. Although computer system 300 is depicted with respect to a particular device or equipment, it is contemplated that other devices or equipment (e.g., network elements, servers, etc.) within FIG. 3 can deploy the illustrated hardware and components of system 300. Computer system 300 is programmed (e.g., via computer program code or instructions) as described herein and includes a communication mechanism such as a bus 310 for passing information between other internal and external components of the computer system 300. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 310 includes one or more parallel conductors of information so that information is transferred quickly among devices coupled to the bus 310. One or more processors 302 for processing information are coupled with the bus 310.

A processor 302 performs a set of operations on information as specified by computer program code. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 310 and placing information on the bus 310. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 302, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 300 also includes a memory 304 coupled to bus 310. The memory 304, such as a random access memory (RAM) or other dynamic storage device, stores information including processor instructions. Dynamic memory allows information stored therein to be changed by the computer system 300. RAM allows a unit of information stored at a location called a memory address to be stored and retrieved independently of information at neighboring addresses. The memory 304 is also used by the processor 302 to store temporary values during execution of processor instructions. The computer system 300 also includes a read only memory (ROM) 306 or other static storage device coupled to the bus 310 for storing static information, including instructions, that is not changed by the computer system 300. Some memory is composed of volatile storage that loses the information stored thereon when power is lost. Also coupled to bus 310 is a non-volatile (persistent) storage device 308, such as a magnetic disk, optical disk or flash card, for storing information, including instructions, that persists even when the computer system 300 is turned off or otherwise loses power.

Information, including instructions, is provided to the bus 310 for use by the processor from an external input device 312, such as a keyboard containing alphanumeric keys operated by a human user, or a sensor. A sensor detects conditions in its vicinity and transforms those detections into physical expression compatible with the measurable phenomenon used to represent information in computer system 300. Other external devices coupled to bus 310, used primarily for interacting with humans, include a display device 314, such as a cathode ray tube (CRT) or a liquid crystal display (LCD), or plasma screen or printer for presenting text or images, and a pointing device 316, such as a mouse or a trackball or cursor direction keys, or motion sensor, for controlling a position of a small cursor image presented on the display 314 and issuing commands associated with graphical elements presented on the display 314. In some embodiments, for example, in embodiments in which the computer system 300 performs all functions automatically without human input, one or more of external input device 312, display device 314 and pointing device 316 is omitted.

In the illustrated embodiment, special purpose hardware, such as an application specific integrated circuit (ASIC) 320, is coupled to bus 310. The special purpose hardware is configured to perform operations not performed by processor 302 quickly enough for special purposes. Examples of application specific ICs include graphics accelerator cards for generating images for display 314, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 300 also includes one or more instances of a communications interface 370 coupled to bus 310. Communication interface 370 provides a one-way or two-way communication coupling to a variety of external devices that operate with their own processors, such as printers, scanners and external disks. In general the coupling is with a network link 378 that is connected to a local network 380 to which a variety of external devices with their own processors are connected. For example, communication interface 370 may be a parallel port or a serial port or a universal serial bus (USB) port on a personal computer. In some embodiments, communications interface 370 is an integrated services digital network (ISDN) card or a digital subscriber line (DSL) card or a telephone modem that provides an information communication connection to a corresponding type of telephone line. In some embodiments, a communication interface 370 is a cable modem that converts signals on bus 310 into signals for a communication connection over a coaxial cable or into optical signals for a communication connection over a fiber optic cable. As another example, communications interface 370 may be a local area network (LAN) card to provide a data communication connection to a compatible LAN, such as Ethernet. Wireless links may also be implemented. For wireless links, the communications interface 370 sends or receives or both sends and receives electrical, acoustic or electromagnetic signals, including infrared and optical signals that carry information streams, such as digital data. For example, in wireless handheld devices, such as mobile telephones like cell phones, the communications interface 370 includes a radio band electromagnetic transmitter and receiver called a radio transceiver. In certain embodiments, the communications interface 370 enables connection to the communication network 110.

The term "computer-readable medium" as used herein refers to any medium that participates in providing information to processor 302, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 308. Volatile media include, for example, dynamic memory 304. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 320.

Network link 378 typically provides information communication using transmission media through one or more networks to other devices that use or process the information. For example, network link 378 may provide a connection through local network 380 to a host computer 382 or to equipment 384 operated by an Internet Service Provider (ISP). ISP equipment 384 in turn provides data communication services through the public, world-wide packet-switching communication network of networks now commonly referred to as the Internet 390.

A computer called a server host 392 connected to the Internet hosts a process that provides a service in response to information received over the Internet. For example, server host 392 hosts a process that provides information representing video data for presentation at display 314. It is contemplated that the components of system 300 can be deployed in various configurations within other computer systems, e.g., host 382 and server 392.

At least some embodiments of the invention are related to the use of computer system 300 for implementing some or all of the techniques described herein. According to one embodiment of the invention, those techniques are performed by computer system 300 in response to processor 302 executing one or more sequences of one or more processor instructions contained in memory 304. Such instructions, also called computer instructions, software and program code, may be read into memory 304 from another computer-readable medium such as storage device 308 or network link 378. Execution of the sequences of instructions contained in memory 304 causes processor 302 to perform one or more of the method steps described herein. In alternative embodiments, hardware, such as ASIC 320, may be used in place of or in combination with software to implement the invention. Thus, embodiments of the invention are not limited to any specific combination of hardware and software, unless otherwise explicitly stated herein.

The signals transmitted over network link 378 and other networks through communications interface 370, carry information to and from computer system 300. Computer system 300 can send and receive information, including program code, through the networks 380, 390 among others, through network link 378 and communications interface 370. In an example using the Internet 390, a server host 392 transmits program code for a particular application, requested by a message sent from computer 300, through Internet 390, ISP equipment 384, local network 380 and communications interface 370. The received code may be executed by processor 302 as it is received, or may be stored in memory 304 or in storage device 308 or other non-volatile storage for later execution, or both. In this manner, computer system 300 may obtain application program code in the form of signals on a carrier wave.

Various forms of computer readable media may be involved in carrying one or more sequence of instructions or data or both to processor 302 for execution. For example, instructions and data may initially be carried on a magnetic disk of a remote computer such as host 382. The remote computer loads the instructions and data into its dynamic memory and sends the instructions and data over a telephone line using a modem. A modem local to the computer system 300 receives the instructions and data on a telephone line and uses an infra-red transmitter to convert the instructions and data to a signal on an infra-red carrier wave serving as the network link 378. An infrared detector serving as communications interface 370 receives the instructions and data carried in the infrared signal and places information representing the instructions and data onto bus 310. Bus 310 carries the information to memory 304 from which processor 302 retrieves and executes the instructions using some of the data sent with the instructions. The instructions and data received in memory 304 may optionally be stored on storage device 308, either before or after execution by the processor 302.

Figure 4:
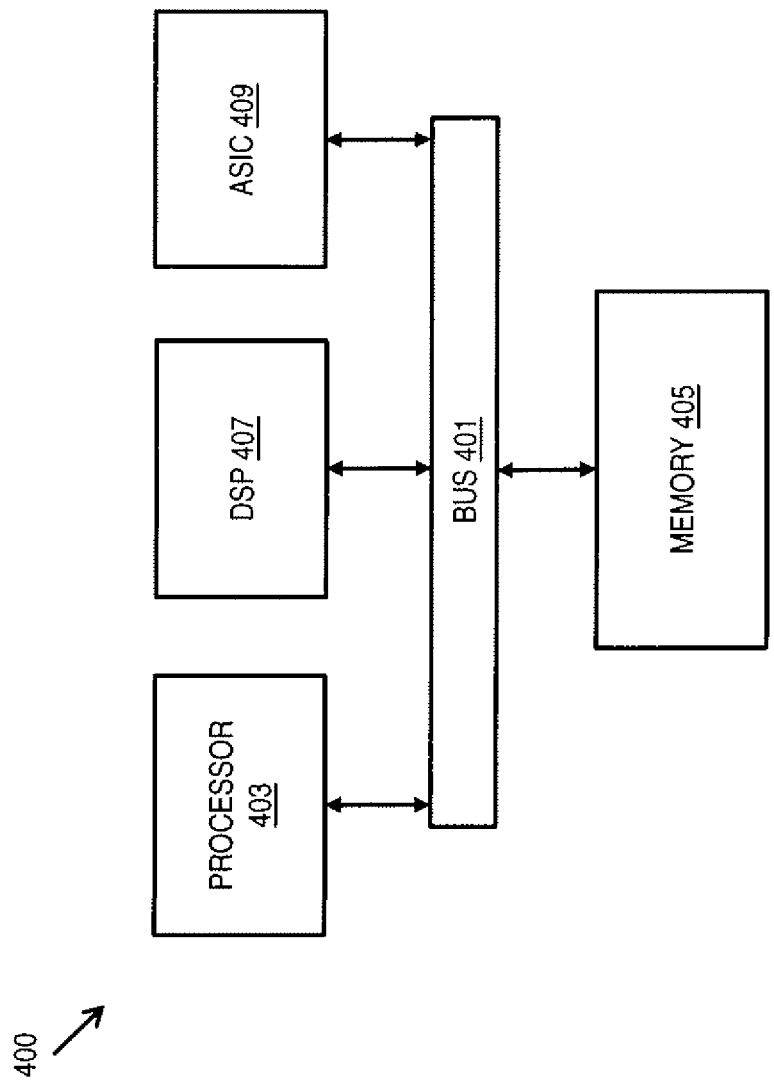
FIG. 4 is a diagram of a chip set operating in accordance with an example embodiment of the invention.

FIG. 4 illustrates a chip set 400 upon which an embodiment of the invention may be implemented. Chip set 400 is programmed to as described herein and includes, for instance, the processor and memory components described with respect to FIG. 3 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 400, or a portion thereof, constitutes a means for performing one or more steps of.

In one embodiment, the chip set 400 includes a communication mechanism such as a bus 401 for passing information among the components of the chip set 400. A processor 403 has connectivity to the bus 401 to execute instructions and process information stored in, for example, a memory 405. The processor 403 may include one or more processing cores with each core configured to perform independently. A multi-core processor enables multiprocessing within a single physical package. Examples of a multi-core processor include two, four, eight, or greater numbers of processing cores. Alternatively or in addition, the processor 403 may include one or more microprocessors configured in tandem via the bus 401 to enable independent execution of instructions, pipelining, and multithreading. The processor 403 may also be accompanied with one or more specialized components to perform certain processing functions and tasks such as one or more digital signal processors (DSP) 407, or one or more application-specific integrated circuits (ASIC) 409. A DSP 407 typically is configured to process real-world signals (e.g., sound) in real time independently of the processor 403. Similarly, an ASIC 409 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 403 and accompanying components have connectivity to the memory 405 via the bus 401. The memory 405 includes both dynamic memory (e.g., RAM, magnetic disk, writable optical disk, etc.) and static memory (e.g., ROM, CD-ROM, etc.) for storing executable instructions that when executed perform the inventive steps described herein. The memory 405 also stores the data associated with or generated by the execution of the inventive steps.

FIG. 5 is a diagram of exemplary components of a mobile terminal (e.g., handset) for communications, which is capable of operating in the system of FIG. 1, according to one embodiment. In some embodiments, mobile terminal 501, or a portion thereof, constitutes a means for performing one or more steps. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 503, a Digital Signal Processor (DSP) 505, and a receiver/transmitter unit including a microphone gain control unit and a speaker gain control unit. A display circuitry unit 506 provides necessary support to the display unit 507. A main display unit 507 provides a display to the user in support of various applications and mobile terminal functions. The display unit 507 may include display circuitry unit 506 configured to display at least a portion of a user interface of the mobile terminal (e.g., mobile telephone). Additionally, the display unit 507 and display circuitry unit 506 are configured to facilitate user control of at least some functions of the mobile terminal. An audio function circuitry 509 includes a microphone 511 and microphone amplifier that amplifies the speech signal output from the microphone 511. The amplified speech signal output from the microphone 511 is fed to a coder/decoder (CODEC) 513.

A radio section 515 amplifies power and converts frequency in order to communicate with a base station, which is included in a mobile communication system, via antenna 517. The power amplifier (PA) 519 and the transmitter/modulation circuitry are operationally responsive to the MCU 503, with an output from the PA 519 coupled to the duplexer 521 or circulator or antenna switch, as known in the art. The PA 519 also couples to a battery interface and power control unit 520.

In use, a user of mobile terminal 501 speaks into the microphone 511 and his or her voice along with any detected background noise is converted into an analog voltage. The analog voltage is then converted into a digital signal through the Analog to Digital Converter (ADC) 523. The control unit 503 routes the digital signal into the DSP 505 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 525 for compensation of any frequency-dependent impairment that occurs during transmission through the air such as phase and amplitude distortion. After equalizing the bit stream, the modulator 527 combines the signal with a RF signal generated in the RF interface 529. The modulator 527 generates a sine wave by way of frequency or phase modulation. In order to prepare the signal for transmission, an up-converter 531 combines the sine wave output from the modulator 527 with another sine wave generated by a synthesizer 533 to achieve the desired frequency of transmission. The signal is then sent through a PA 519 to increase the signal to an appropriate power level. In practical systems, the PA 519 acts as a variable gain amplifier whose gain is controlled by the DSP 505 from information received from a network base station. The signal is then filtered within the duplexer 521 and optionally sent to an antenna coupler 535 to match impedances to provide maximum power transfer. Finally, the signal is transmitted via antenna 517 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 501 are received via antenna 517 and immediately amplified by a low noise amplifier (LNA) 537. A down-converter 539 lowers the carrier frequency while the demodulator 541 strips away the RF leaving only a digital bit stream. The signal then goes through the equalizer 525 and is processed by the DSP 505. A Digital to Analog Converter (DAC) 543 converts the signal and the resulting output is transmitted to the user through the speaker 545, all under control of a Main Control Unit (MCU) 503—which can be implemented as a Central Processing Unit (CPU) (not shown).

The MCU 503 receives various signals including input signals from the keyboard 547. The keyboard 547 and/or the MCU 503 in combination with other user input components (e.g., the microphone 511) comprise a user interface circuitry for managing user input. The MCU 503 runs a user interface software to facilitate user control of at least some functions of the mobile terminal 501. The MCU 503 also delivers a display command and a switch command to the display circuitry unit 506 and to the speech output switching controller, respectively. Further, the MCU 503 exchanges information with the DSP 505 and can access an optionally incorporated SIM card 549 and a memory 551. In addition, the MCU 503 executes various control functions required of the terminal. The DSP 505 may, depending upon the implementation, perform any of a variety of conventional digital processing functions on the voice signals. Additionally, DSP 505 determines the background noise level of the local environment from the signals detected by microphone 511 and sets the gain of microphone 511 to a level selected to compensate for the natural tendency of the user of the mobile terminal 501.

The CODEC 513 includes the ADC 523 and DAC 543. The memory 551 stores various data including call incoming tone data and is capable of storing other data including music data received via, e.g., the global Internet. The software module could reside in RAM memory, flash memory, registers, or any other form of writable storage medium known in the art. The memory device 551 may be, but not limited to, a single memory, CD, DVD, ROM, RAM, EEPROM, optical storage, or any other non-volatile storage medium capable of storing digital data.

An optionally incorporated SIM card 549 carries, for instance, important information, such as the cellular phone number, the carrier supplying service, subscription details, and security information. The SIM card 549 serves primarily to identify the mobile terminal 501 on a radio network. The card 549 also contains a memory for storing a personal telephone number registry, text messages, and user specific mobile terminal set.

What is claimed is:

1. A method comprising:
    attempting loading, from one or more network servers, configuration information of the one or more network servers used by a service provider network;
    on condition that loading configuration information is not successful, setting a predetermined limit on unsuccessful attempting loadings and/or a predetermined timeout period in which to successfully load the configuration information;
    upon reaching said predetermined limit and/or said predetermined timeout period and the loading configuration information is not successful, loading one or more beacons from the one or more network servers;
    on condition that the one or more beacons from the one or more network servers are successfully received, selecting a network server in the service provider network based at least in part on information in the one or more beacons; and
    causing, at least in part, setting of the selected network server as a default network server used for at least one of current and future session on one or more user equipment, wherein the configuration information includes the network server latency and network server load.

2. A method of claim 1, wherein communication between the one or more network servers is via the one or more user equipment.

3. A method of claim 1, further comprising:
    executing, on the one or more user equipment, computer programmable code, received from the one or more beacons, for selecting the network server.

4. A method of claim 1, wherein the selected network server is predefined in computer program code on the user equipment.

5. A method of claim 1, wherein a network server sends and receives the one or more beacons.

6. A method of claim 5, wherein the one or more beacons are sent to the one or more network servers and/or one or more other network servers.

7. An apparatus comprising:

at least one processor; and at least one memory including computer program code, the at least one memory and the computer program code configured to, with the at least one processor, cause the apparatus to perform at least the following:

attempt to load, from one or more network servers, configuration information of the one or more network servers used by a service provider network;

on condition that loading configuration information is not successful, set a predetermined limit on unsuccessful attempting loadings and/or a predetermined timeout period in which to successfully load the configuration information;

upon reaching said predetermined limit and/or said predetermined timeout period and the loading configuration information is not successful, load one or more beacons from the one or more network servers;

on condition that the one or more beacons from the one or more network servers are successfully received, select a network server in the service provider network based at least in part on information in the one or more beacons; and cause, at least in part, to set the selected network server as a default network server used for at least one of current and future session on one or more user equipment, wherein the configuration information includes the network server latency and network server load.

8. An apparatus of claim 7, wherein the communication between the one or more network servers is via the one or more user equipment.

9. An apparatus of claim 7, wherein the apparatus is further caused to:

execute, on the one or more user equipment, computer programmable code, received from the one or more beacons, to select the network server.

10. An apparatus of claim 7, wherein the selected network server is predefined in computer program code on the user equipment.

11. An apparatus of claim 7, wherein a network server sends and receives the one or more beacons.

12. An apparatus of claim 7, wherein the beacon is sent to the one or more network servers.

13. An apparatus of claim 7, wherein the apparatus is a mobile phone further comprising:

user interface circuitry and user interface software configured to facilitate user control of at least some functions of the mobile phone through use of a display and configured to respond to user input; and a display and display circuitry configured to display at least a portion of a user interface of the mobile phone, the display and display circuitry configured to facilitate user control of at least some functions of the mobile phone.

14. A non-transitory computer-readable storage medium carrying one or more sequences of one or more instructions which, when executed by one or more processors, cause an apparatus to at least perform the following:

attempting loading, from one or more network servers, configuration information of the one or more network servers used by a service provider network;

on condition that loading configuration information is not successful, setting a predetermined limit on unsuccessful attempting loadings and/or a predetermined timeout period in which to successfully load the configuration information;

upon reaching said predetermined limit and/or said predetermined timeout period and the loading configuration information is not successful, loading one or more beacons from the one or more network servers;

on condition that the one or more beacons from the one or more network servers are successfully received, selecting a network server in the service provider network based at least in part on information in the one or more beacons; and causing, at least in part, the setting of the selected network server as a default network server used for at least one of current and future session on one or more user equipment, wherein the configuration information includes the network server latency and network server load.

15. A non-transitory computer-readable storage medium of claim 14, wherein the apparatus is further caused to perform:

execute, on the one or more user equipment, computer programmable code received, from the one or more beacons, for selecting the network server.

* * * * *